Figure 1:
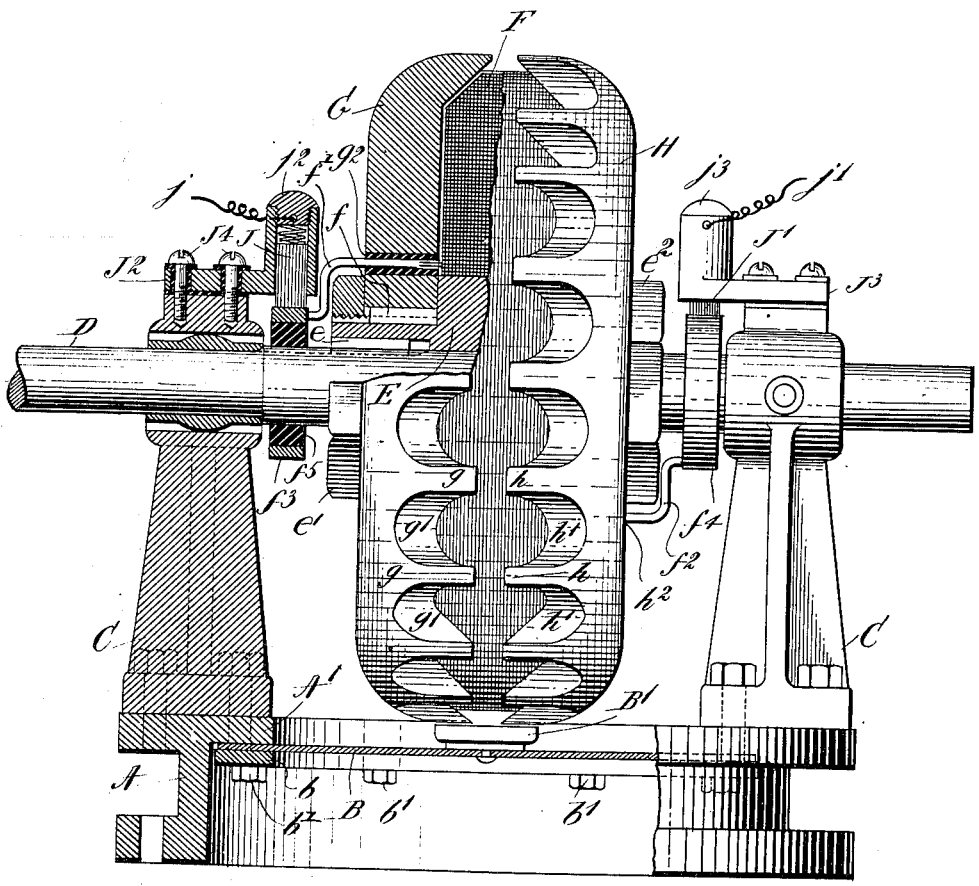

E. C. WOOD.
SOUNDER.
APPLICATION FILED SEPT. 22, 1909.

1,035,292.

Patented Aug. 13, 1912.
9 SHEETS—SHEET 1.

WITNESSES:

INVENTOR:

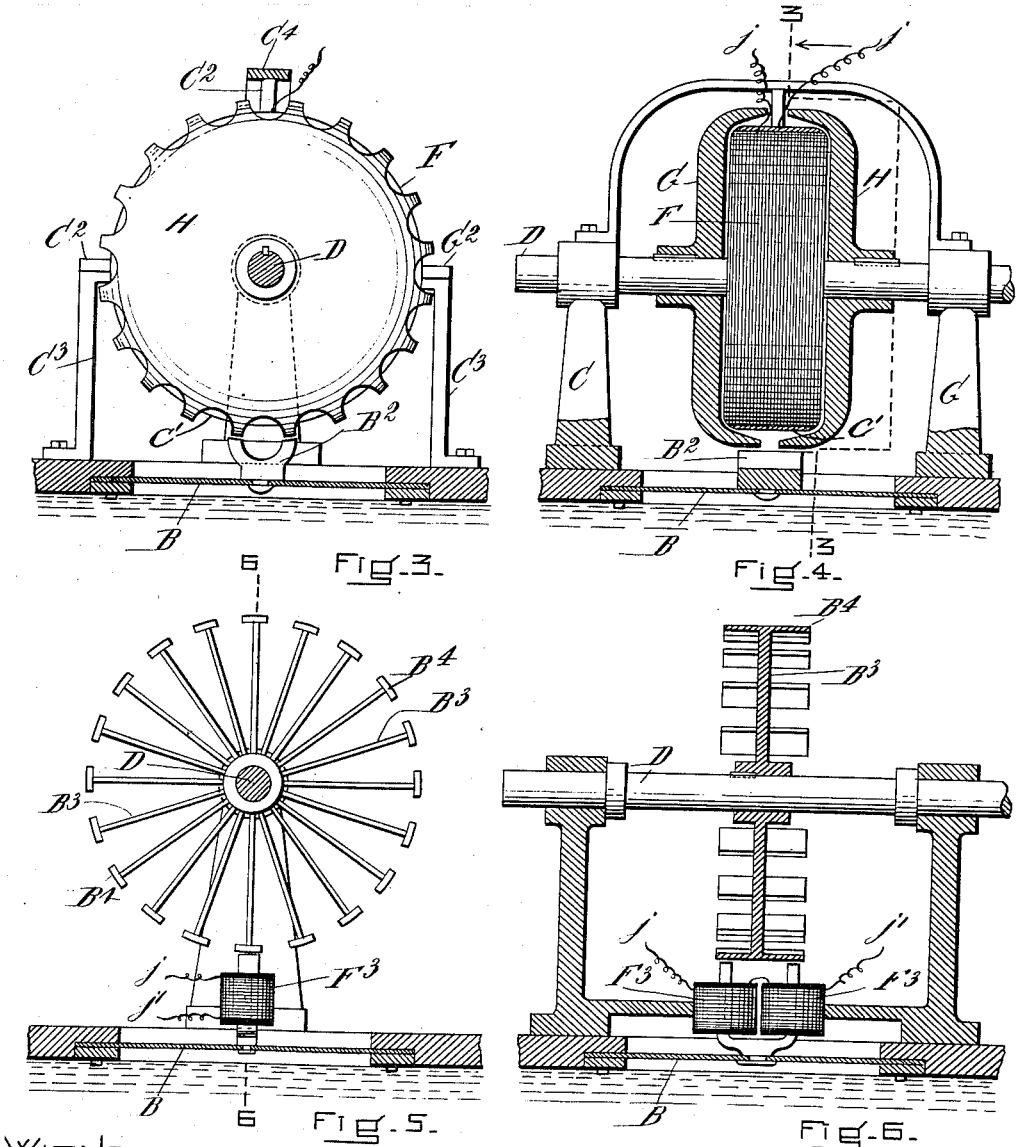

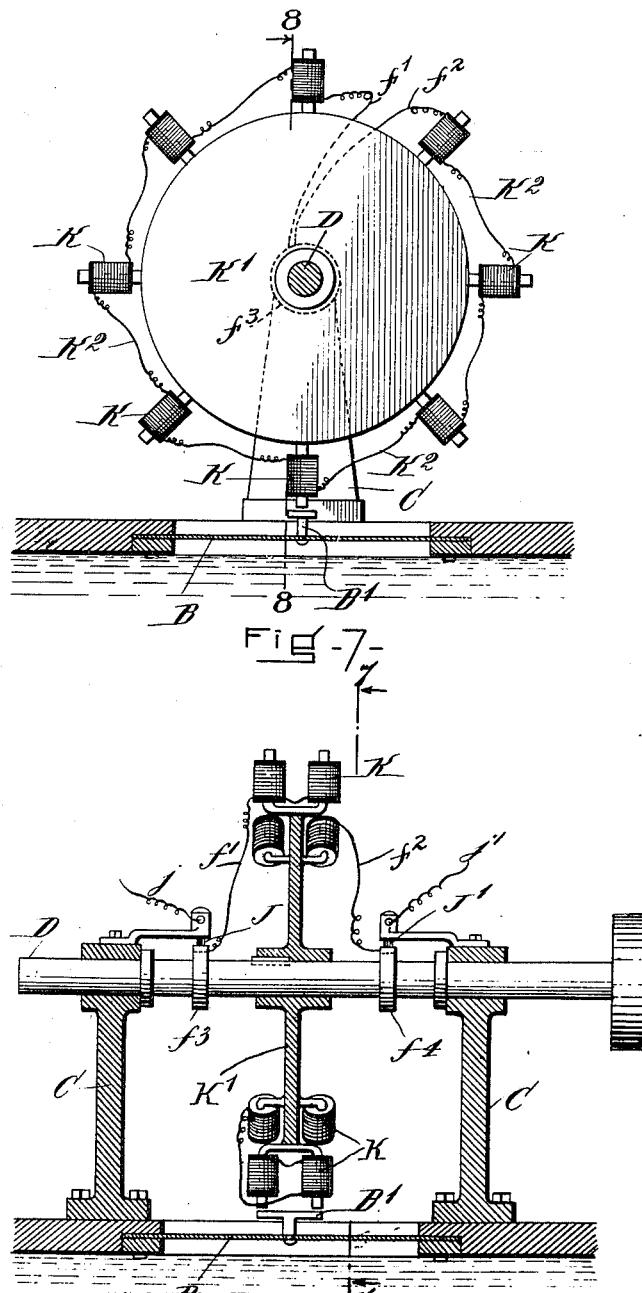

E. C. WOOD.
SOUNDER.
APPLICATION FILED SEPT. 22, 1909.

1,035,292.

Patented Aug. 13, 1912.
9 SHEETS—SHEET 5.

WITNESSES:
M. E. Flaherty.
J. D. McPherson.

INVENTOR
Edward C. Wood

E. C. WOOD.
SOUNDER.
APPLICATION FILED SEPT. 22, 1909.

1,035,292.

Patented Aug. 13, 1912.
9 SHEETS—SHEET 8.

WITNESSES:
M. E. Flaherty.
J. D. McPherson.

INVENTOR:
Edward C. Wood

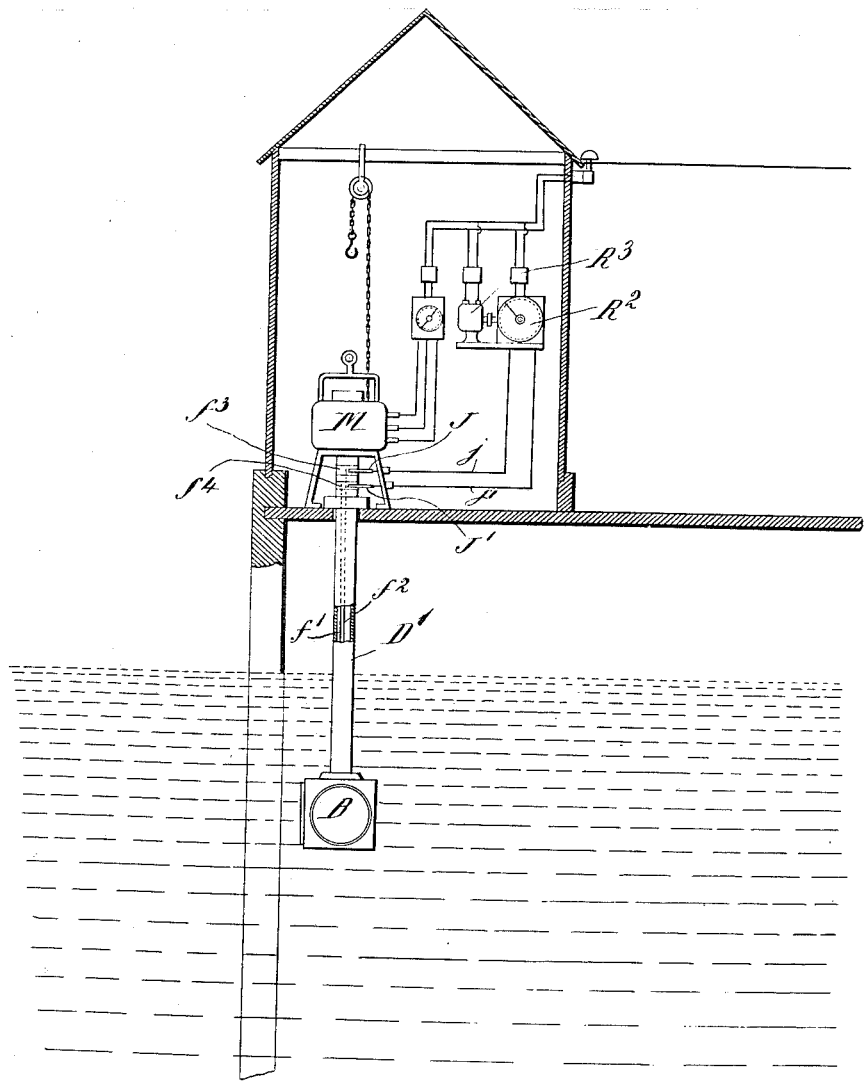

UNITED STATES PATENT OFFICE.

EDWARD C. WOOD, OF SOMERVILLE, MASSACHUSETTS, ASSIGNOR TO SUBMARINE SIGNAL COMPANY, OF WATERVILLE, MAINE, A CORPORATION OF MAINE.

SOUNDER.

1,035,292. Specification of Letters Patent. Patented Aug. 13, 1912.

Application filed September 22, 1909. Serial No. 519,079.

*To all whom it may concern:*

Be it known that I, EDWARD C. WOOD, of Somerville, in the county of Middlesex and State of Massachusetts, a citizen of the United States, have invented a new and useful Improvement in Sounders, of which the following is a specification.

The especial purpose of my invention is to secure an apparatus for submarine signaling which shall be simple and upon which code signals can be sounded of sufficient strength to be heard a number of miles.

A submerged bell percussively struck has proved satisfactory in many cases for producing submarine signals as, for example, when attached to a buoy, a lightship, a pier or a tripod on the sea floor or other stationary object and employed as a coast warning or guiding signal. It has also proved effective in many other cases. For signaling from one rapidly moving ship to another, however, a bell has not proved so satisfactory as for a coast warning or guiding signal. Moreover a sound carrying far enough to give ample warning to a moving ship when sent from a lightship or other stationary object may not carry far enough to give an ample warning when sent from an approaching ship, as the speed of the two ships reduces the time of warning. For communicating messages by code a percussively struck bell is not so satisfactory as a sounder which can produce signals of any desired duration. For if the duration of a sound of constant strength can be controlled it becomes possible to use it in any system of code signaling such as for transmitting messages by the Morse alphabet. Moreover the introduction of signals of any desired duration makes it possible to distinguish signals sent from fixed points from those sent from moving ships, should such a distinction seem desirable. In other words, the addition of a new type of signal, viz: one comprising continuous sounds of any desired duration, adds another factor to submarine signaling which materially increases its possibilities. To secure such results I have invented a sounder which is, broadly speaking, new in that the means whereby it is operated is a plurality of energizing elements each of which acts in turn to attract a diaphragm so that the diaphragm is alternately attracted and released and so set in sufficiently rapid vibration to produce sound waves capable of intelligent recognition.

My invention instead of utilizing a single electro-magnet which by its frequent changes of magnetic condition is intended to cause pulsations to be set up in the diaphragm; contemplates in its preferred form the passage of a plurality of magnetic fields within the effective flux of the diaphragm which if necessary may carry an armature attached to it. In this case the vibration of the armature is caused by the alternate increasing and diminishing of the magnetic force acting upon the diaphragm itself or a piece of iron or other magnetic material attached to the diaphragm. By proportioning the diameter and thickness of the diaphragm to the speed of the passage of the magnets, vibration of the diaphragm may be set up which will cause a strong musical note capable of transmission for a long distance, and this note will continue so long as magnetic fields of sufficient strength pass in actuating relation to it, but it may be interrupted at any time by diminishing the strength of the fields or changing their relation to the diaphragm. My invention equally contemplates the use of an electromagnet attached to the diaphragm and the passage of a plurality of armatures within the attractive reach of the magnet.

In the above statement of my invention I have for the sake of simplicity used the word "diaphragm" in reference to the sound-producing body. My invention, however, also contemplates the use of a bell, reed, plate or any form of sound-producing vibrator, and I shall hereinafter use the term "vibrator" for the purpose of including such devices.

In the simplest form of my invention now known I use a rotary electro-magnet constructed of two soft iron disks side by side and connected by a core, a helix or exciting coil placed about the core joining the two disks, the disks having teeth cut in their peripheries so as to form projections located opposite to each other and in close proximity to each other. On passing a current through the helix the disks will become magnetized and fields formed at the teeth. In rotating the magnet near a soft iron armature attractive impulses will be set up at the period at which each pair of teeth pass the armature. High periods of vibration may be created, as a magnet of this construction may have many teeth or projections and be rotated with great rapidity. In this method of exciting a body one does not encounter the difficulties of magnetic lag or hysteresis, and counter electro-motive force. As it is necessary to use a high degree of power to establish submarine sounds and at the same time it is impracticable to produce magnetic impulses at a high rate of vibration by repeated interruptions of the large electrical currents necessary, I have in this manner constructed a magnet in which the current can be constantly flowing, and the impulses of the vibrator can be brought about by the movement past the armature of its magnetic fields. This vibratory action continues so long as current passes through the coil. When the current is interrupted the poles lose their magnetism, and the diaphragm ceases to originate sound waves of signaling value; in fact, it usually becomes silent, taking up its work again the moment the electric current again passes through the coil. The interruption of the current is thus utilized not for causing the magnetic impulses by which each vibration of the diaphragm is caused, for such vibrations are caused by the approach and recession of the magnetic fields, but for the separation of one period of active vibration from another so that code signals may be sounded. The code mechanism therefore comprises a circuit breaker by which the current which energizes the magnet is interrupted, and this circuit breaker may be operated automatically or by a hand-operated key. In the former case the sounder will continuously give out signals of predetermined character and in the latter case may be caused to give out signals which will enable the sender to communicate information of any character to any person on board ship or at a shore station who has the now well known instruments for receiving submarine sound waves. The system thus indicated is well adapted for installation and use upon submarine boats as it requires but little room and is operable by power of the character utilized for other purposes on such boats.

It will be seen that this invention may be embodied in various ways. In some forms of my invention the magnet might theoretically be a permanent magnet, but practically an electro-magnet is the simplest and best as it is much more powerful and is constant in strength. The vibrator may be in itself subject to magnetic attraction, e. g. made of soft iron, or it may carry one or more armatures. Moreover a similar result may be secured by placing a single magnet upon the vibrator, using a number of armatures with means to cause them to approach and recede from the vibrator in rapid succession so as to cause the vibrator to set up the necessary vibration resulting from the attraction of the magnet by the armatures. Certain of these methods are especially applicable to code signaling and certain of them appear to be applicable rather to the setting up of an uninterrupted vibration of the vibrator, as will be more clearly understood from the description hereinafter given. Thus it will be seen that my invention has a breadth not measurable by any specific form of apparatus, but capable of embodiment in any one of a number of forms.

My invention will be understood by reference to the drawings, in which—

Figure 2:
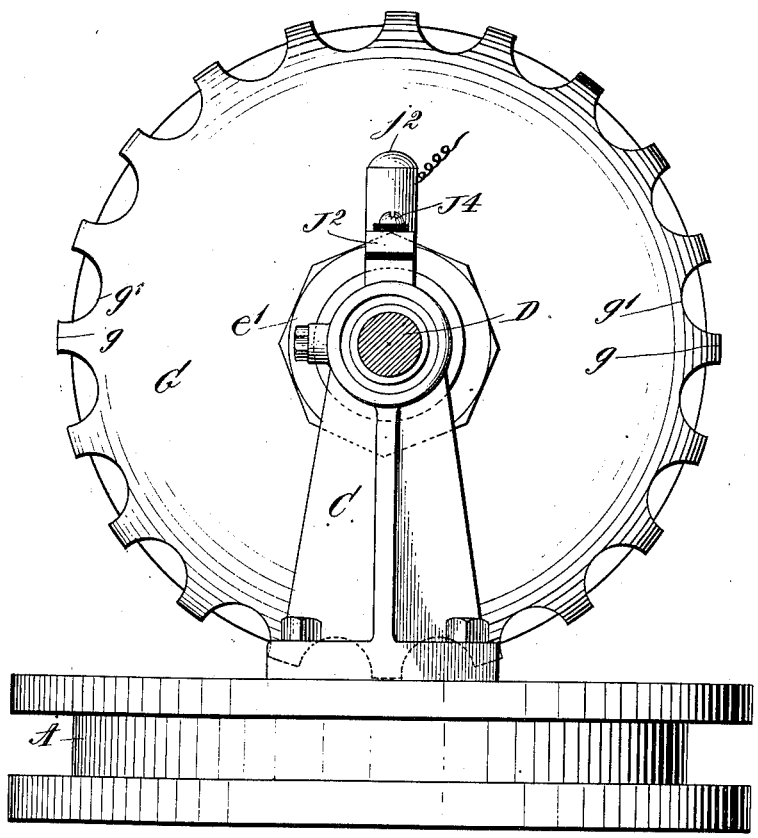
Figure 9:
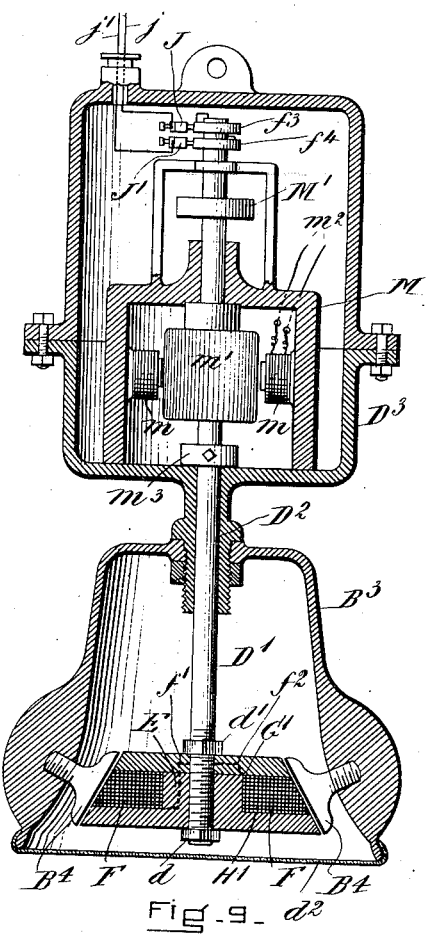
Figure 10:
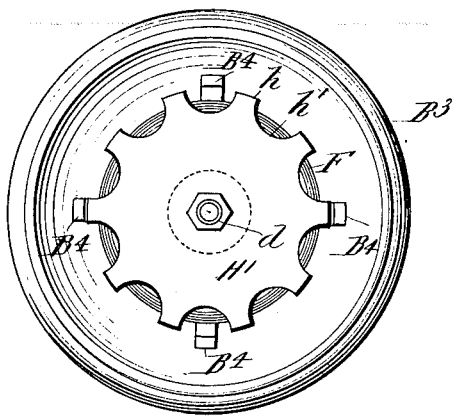
Figure 11:
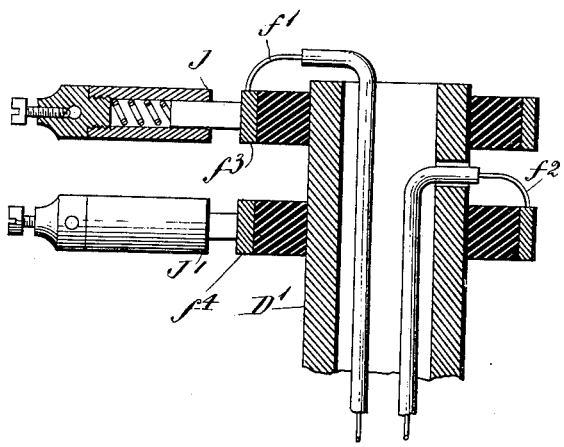
Figure 12:
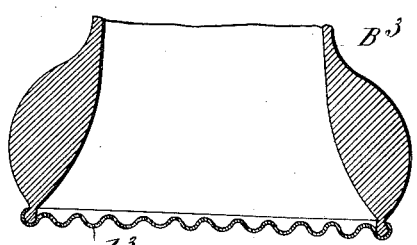
Figure 13:
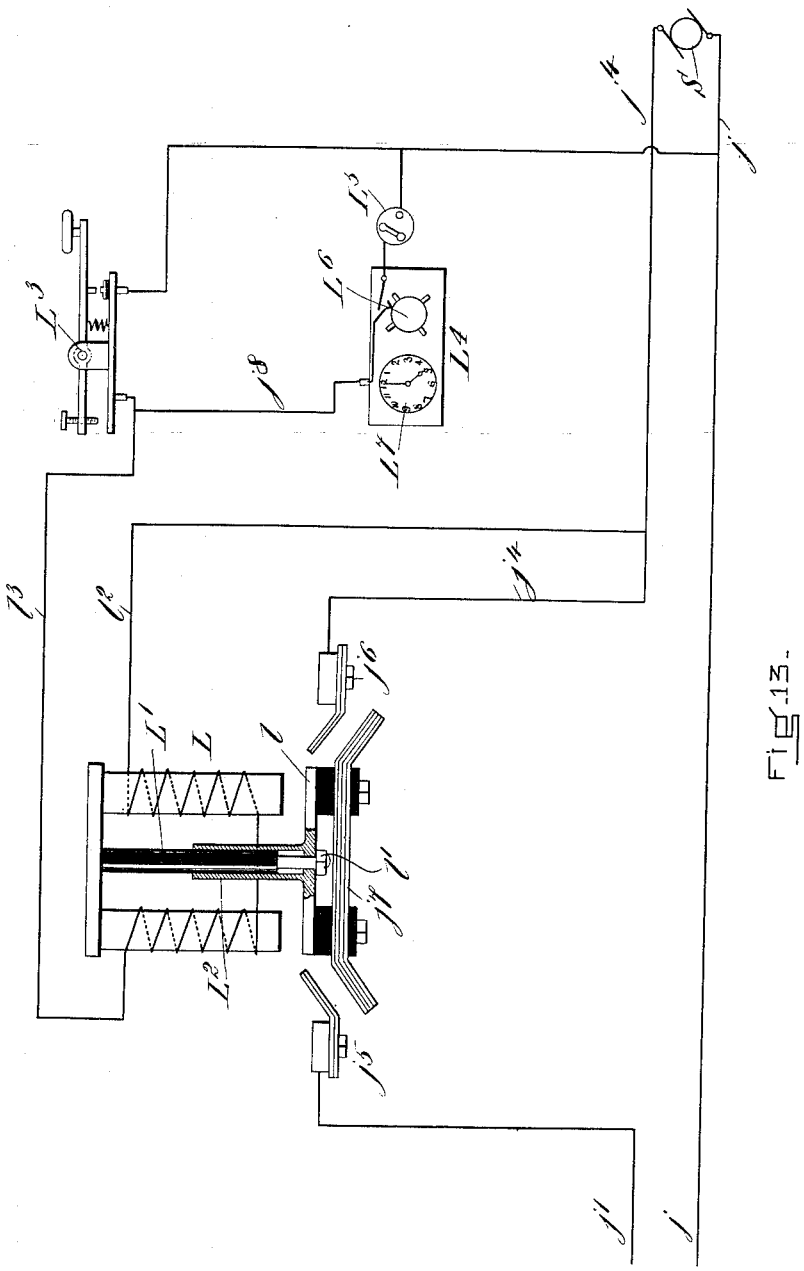
Figure 14:
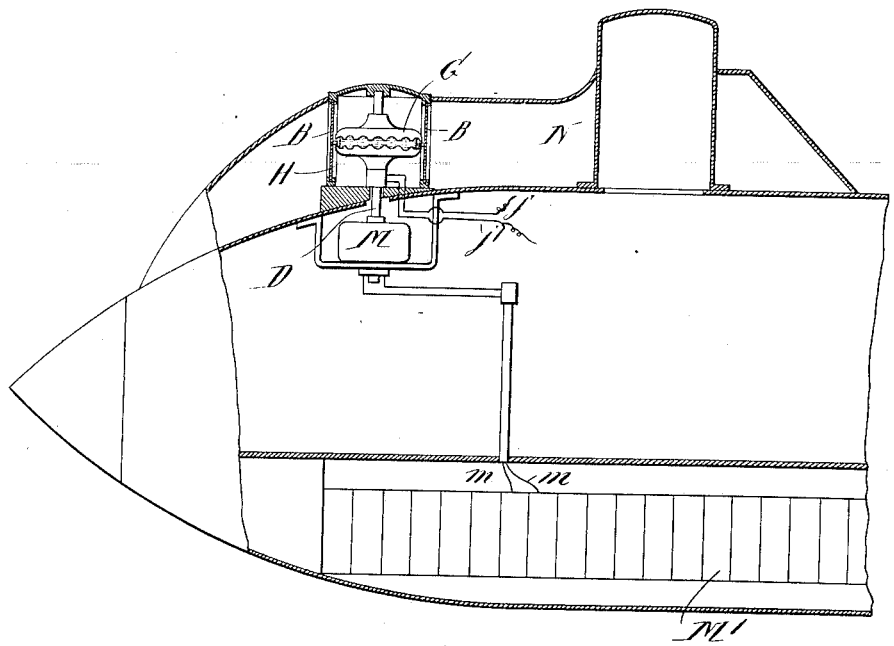

Figure 1 is a plan partly in section of the preferred form of apparatus embodying my invention, Fig. 2 being a side elevation thereof. Fig. 3 is a section on line 3—3 of Fig. 4, and Fig. 4 a vertical section at right angles to Fig. 3, showing a modification. Fig. 5 is a vertical sectional view showing another modification. Fig. 6 is a section on the line 6—6, Fig. 5. Fig. 7 is a sectional view on the line 7—7, Fig. 8, showing still another modification. Fig. 8 is a vertical section at right angles to Fig. 7. Fig. 9 is a view in section showing the application of my invention to a bell-shaped vibrator. Fig. 10 is a bottom plan view of the apparatus shown in Fig. 9, the cap for closing the mouth of the bell being omitted. Fig. 11 is a sectional detail showing the means of connecting the terminals of the coil with the source of electrical energy. Fig. 12 is another form of bell closure to be described below. Fig. 13 is a diagrammatic view of the interrupter showing both the arrangement of the hand and the continually operated means for breaking the exciting circuit. Fig. 14 is a sectional elevation of the bow of a submarine boat to which my invention is applied, Fig. 15 being a plan thereof. Fig. 16 is a horizontal section showing another application of my invention to a vessel, Fig. 17 being a vertical section on line 17—17 of Fig. 16. Fig. 18 is a horizontal section showing still another application of my invention to a vessel, and Fig. 19 is a vertical section of a pier head house with my invention installed therein.

For the best results in submarine signaling it is well known that the originator of sound waves must be in contact with a medium of the same character as that through which the sound waves are to be transmitted. Therefore where a device such as is hereinafter described is to be used on shipboard it is desirable that the vibrator or diaphragm shall be immersed in water or equivalent liquid; thus it may form part of one of the walls of the ship below the water line or form a side or part of the side of a water or liquid tank attached to the skin of the ship, the tank in the latter case being kept full of water; or the vibrator may be wholly surrounded by water. Such construction will be hereinafter illustrated. It will also be apparent as below more fully described that the vibrator exciter may excite a plurality of vibrators arranged about it to send out sound waves in different directions or forming the walls of a case inclosing the exciter, the whole being submerged in a tank or in the water as at a pier head.

Referring now to the preferred form of my device as shown in Fig. 1: The vibrator holder comprises a casing A of any suitable form adapted to be bolted to the inner wall or skin of the ship or the wall of a tank. This casing is provided with an inwardly-projecting lip $A^1$ against the under side of which is bolted the vibrator B by a gasket $b$ and bolts $b^1$. This gasket answers as a packing. The vibrator is preferably circular in shape, conforming to and closing the end of an opening in the casing A. Such a circular diaphragm held fast at the edges will readily take up a given rate of vibration and thus originate sound waves of a given pitch.

Upon the casing A is mounted a pair of supports C, each having at its upper end a bearing of suitable character for the shaft D. Any form of bearing capable of allowing rapid rotation of the inclosed shaft will answer this purpose. Upon this shaft is keyed by a key $e$ a core E made of soft iron, upon which is mounted a coil F. Keyed to the core by a key $f$ are pole pieces G and H, the core being threaded and nuts $e^1$ and $e^2$ holding the pole pieces on the core, clamping them and the core together. In Fig. 1 this construction is shown on one side partly in section. The pole piece H and mechanism upon its side of the device is identical with that which is disclosed by the section. It will be seen therefore that there is here material for an electro-magnet, viz: the coil F about the core E to which core is attached, the two pole pieces forming the north and south poles of the electro-magnet. The shaft D is connected to a motor or any source of power whereby it may be rotated with great rapidity. These pole pieces are of peculiar construction in that each pole piece is provided about its edge with a series of projections or teeth $g$, $h$ between which are a series of recesses $g^1$, $h^1$. The vibrator B carries an armature $B^1$, and when these pole pieces, which of necessity must rotate together, are magnetized, the points of one pole piece being opposite those of the other, a series of magnetic fields of alternately increasing and decreasing force pass within attracting range of the armature $B^1$, the instant of maximum attraction being at the moment when a pair of projections $g$, $h$ of the pole pieces are nearest the armature, after which there is a decrease in magnetic attraction as the projections move away until the next projections in series have come nearer to the armature than are the receding projections. By this means there is a constantly increasing and decreasing attractive force applied to the armature which of necessity causes the armature to vibrate and with it the diaphragm, and upon a very rapid rotation of the magnet this vibration of the diaphragm or vibrator becomes sufficient in point of speed to give out a musical note. It is evident that this vibration and hence this musical note will keep up so long as the magnetized pole pieces are caused to rotate. The magnet being preferably an electro-magnet, however, the vibrations of the vibrator may be controlled to cause it to give out a sound of greater or less length by interrupting the electric current by means of which magnetic influence is excited in the pole pieces.

To connect the coil F with the source of electric energy I perforate each pole piece as at $g^2$, $h^2$ and lead through the perforations, the walls of which are insulated, the two ends $f^1$, $f^2$ of the coil F. Each end $f^1$, $f^2$ is connected to a ring $f^3$, $f^4$ mounted upon an insulation $f^5$ which is carried by the shaft D, an insulation being provided for each ring. The insulation $f^5$ and rings $f^3$, $f^4$ are attached together and to the shaft D so that they will rotate with the electro-magnet and yet will be insulated from the shaft. Brushes J, $J^1$ are provided and also wires $j$, $j^1$ which lead to the dynamo, being attached to the brush holders by the binding screws $j^2$, $j^3$. The brush holders are attached to the top of the supports C by means of lugs $J^2$, $J^3$ and screws $J^4$, the parts being all properly insulated as will be understood by those skilled in the art.

In operating this mechanism power is applied to the shaft D to rotate it with great rapidity according to the diameter of the diaphragm and its normal rate of vibration. With the shaft in this form of my invention rotates the core, coil, pole pieces and the rings $f^3$, $f^4$ with their insulators. The brushes J, $J^1$ form the electrical connection between the stationary binding screws and the coil. This rotation causes the projections on the pole pieces to pass successively the armature $B^1$ so that it is influenced by a series of magnetic fields increasing and decreasing in turn which pass it in regular rotation and cause it to excite the vibrator to a regular speed of vibration depending of course upon the rapidity with which the shaft D is revolving. The speed, however, should be in proper relation to the natural rate of vibration of the vibrator. The vibration of the vibrator causes sound waves to be originated which are taken up by the water and finally conducted by transmitters or other receiving instruments on board other ships or at other properly equipped stations.

In order that ships may communicate one with another or with a lightship station or the shore it is necessary that a code be established, and this apparatus lends itself to the sending of messages, as for example by the ordinary Morse system, for the reason that the magnetic influence may be interrupted and the effectiveness of the magnetic fields diminished materially by interrupting the current which energizes the electro-magnet. This may be done by means such as are below described. I realize that there may be residual magnetism in the electro-magnet after the current is cut off; but in the present instance the magnetic attraction in the pole pieces is reduced to such an extent as to nullify its operative power of attraction for the armature. Hence by placing an ordinary telegraphic key so as to control the current in the coil F the action of the vibrator can be reduced periodically at predetermined intervals to such an extent that it will no longer originate vibrations of sufficient intensity to be perceptible with transmitters such as are ordinarily used. Thus it is easy to utilize the Morse code or any other similar code which will enable the sender by a series of long and short effective vibrations of the vibrator to transmit an intelligible message to any point of receipt, or to use any automatic code such as used on bell buoys.

I have shown in Figs. 3 and 4 an apparatus which is in many respects similar to that shown in Figs. 1 and 2. It operates in the same general manner, but it differs from the device of Figs. 1 and 2 in that the coil F is inclosed in a cylindrical case $C^1$ suspended by arms $C^2$, two of which are carried by supports $C^3$, while the third is mounted on the arch $C^4$ mounted on the supports C. In this case the core joining the pole pieces rotates with the pole pieces of course but inside of the coil. In this, also, I have shown another form of armature which is attached to the diaphragm B. This armature is Y-shaped as shown at $B^2$, the distance between the extremities of the armature corresponding to the distances between two of the projections on a pole piece. This can be seen in Fig. 3.

In Figs. 5 and 6 the apparatus is reversed, that is to say, the shaft D carries a series of spokes $B^3$ at the end of each of which is an armature $B^4$. Upon the diaphragm or vibrator B is mounted an electro-magnet $F^3$ which is connected by wires $j$, $j^1$ with the source of electric current. It will be seen that in this case the rapid rotation of the armatures brings each in turn into and out of attracting relation with the electro-magnet and as the electro-magnet is mounted upon the vibrator vibrations are set up in the vibrator which cause it to move toward and from the axis of rotation of the wheel of armatures so that in this case the same law of operation exists.

In Figs. 7 and 8 still another form of construction is shown, the diaphragm or vibrator B carrying an armature $B^1$, as shown in Figs. 1 and 2. In this case, however, a series of electro-magnets K connected together by wires $K^2$ is mounted on the periphery of a wheel $K^1$ carried by the shaft D, the electro-magnet system being connected as at Fig. 1 with an insulated ring $f^3$, $f^4$ by wires $f^1$, $f^2$, brushes J $J^1$ being used as before to make contact between the rings $f^3$, $f^4$ and wires $j$, $j^1$ for connecting with the dynamo or other source of current. The precise arrangement of wiring is immaterial, it being merely essential that the circuit through the magnets K be completed to the rings $f^3$, $f^4$. These last views are merely illustrative and suggestive of the breadth of my invention, the more practical form of which I believe to be that shown in Figs. 1 and 2. These views, however, also show a simplified form of casing and gasket, the casing being a part of the wall of the water tank.

As a means for applying the code signal to a sounder of this character, and by that I mean a means for interrupting a current which passes through the coil by which the rotary magnet is energized, I have shown diagrammatically in Fig. 13 one form of apparatus useful for the purpose. In this case the line $j$ runs from one of the terminals of the coil F to the source of electrical energy S. The other terminal of the coil is connected with the line $j^1$ which is interrupted by a circuit breaker and is continued in the line $j^4$ to the source of electrical energy S. The circuit breaker shown comprises two terminals $j^5$, $j^6$ which are connected by the brush contact $j^7$ operated by a relay L. This contact $j^7$ is connected to an armature $l$ from which it is insulated and the armature $l$ is operated either against gravity or a spring by means of the relay L. For this purpose the relay magnet L has the insulated rod $L^1$ upon which slides a sleeve $L^2$ connected to and, if desirable, forming a part of the armature $l$. A stop $l^1$ screwed into the end of the rod $L^1$ limits the movement of the armature. The coil carrying the current to energize the relay comprises wires $l^2$, $l^3$ one of them $l^2$ leading to one of the wires $j^4$ of the main circuit and the other leading to the wire $j$ through an ordinary telegraph key $L^3$. A shunt $j^8$ is connected to the wire $l^3$ around the key $L^3$ and contains a code mechanism $L^4$ of well known construction and a switch $L^5$ to throw the code mechanism into and out of circuit so that either automatic code signals or hand signals may be sent. The code signal comprises a rotary circuit breaker L⁶ operated by a clock L⁷ or in any other convenient way. Such a device is so well known in the art that its details need not be described. The circuit in the shunt formed by the relay L and its connecting wires is of sufficient resistance to reduce the current so that it will not injure the apparatus in that circuit, yet will be sufficient to operate the circuit breaker or contact $j^7$ at the appropriate times and those times will be determined either by the operation of the telegraphic key L³ or by the code signal L⁴. As shown in this diagramatic figure the windings of the relay furnish the necessary resistance. When the code signal is to be used the switch L⁵ will be closed and the key left open or if the key is to be used to send, for example, telegraphic signals according to the Morse or some other system, the switch L⁵ will be opened. By this or some similar means the main circuit may be opened and closed at will without injury to the apparatus such as might occur if the current were heavy.

Figure 15:
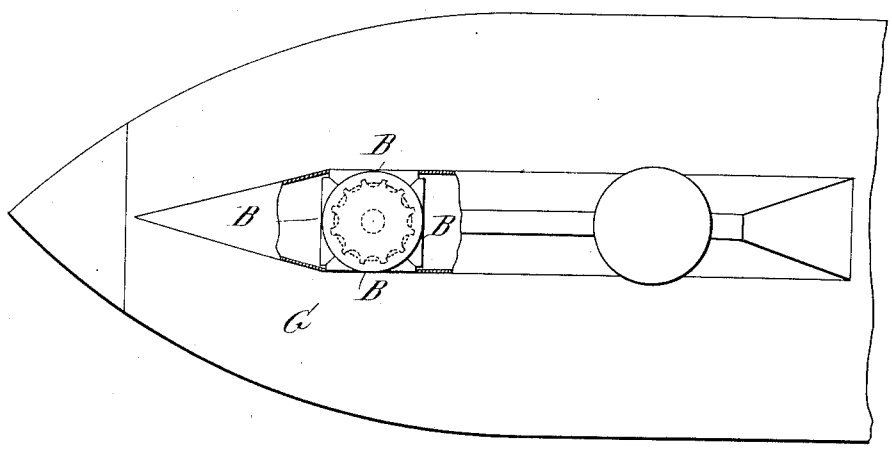
Figure 16:
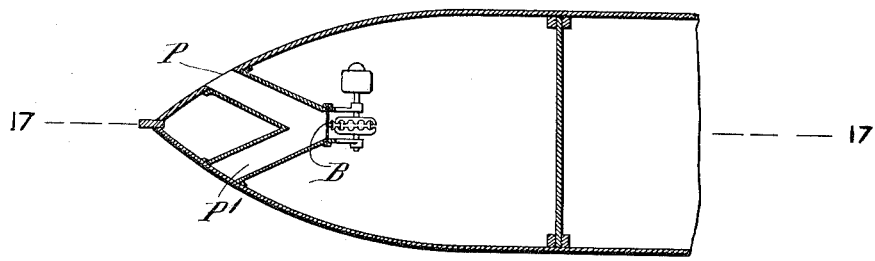

My invention as above described is useful for submarine boats, and while it may be introduced into any convenient part of the boat it has seemed to me desirable to introduce it in the superstructure as shown in Figs. 14 and 15. In this case the storage battery by means of which the motor is operated is shown at M¹, the wires, $m$, $m$ leading from it directly to the motor M by which power is applied to the shaft D carrying the magnet of which the pole pieces G and H are shown, B, B, being the vibrators. In this case it will be noted that there are four vibrators located at ninety degrees on the four sides of the pole pieces G, H, forming a watertight case, all of which will be operated simultaneously when the coil is energized and the pole pieces become magnetized thereby; and it is necessary for efficiency that the projections $g$, $h$ on the pole pieces shall be a multiple of four in number in order that they may work in harmony on the diaphragms. In fact, this should always be so when more than one diaphragm is used. I have not shown the details of construction nor the location of the circuit breaker in the coil circuit as the apparatus is preferably like that shown in Fig. 13 and may be in any convenient part of the boat. In this case the diaphragms become the walls of the watertight chamber, the space about the chamber filling with water when the submarine boat is submerged, so that the vibrations of the diaphragms B are delivered directly into the liquid surrounding the diaphragms from which they are disseminated in all directions.

Figure 17:
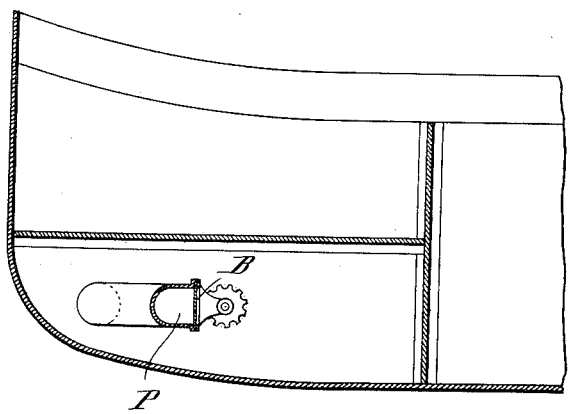
Figure 18:
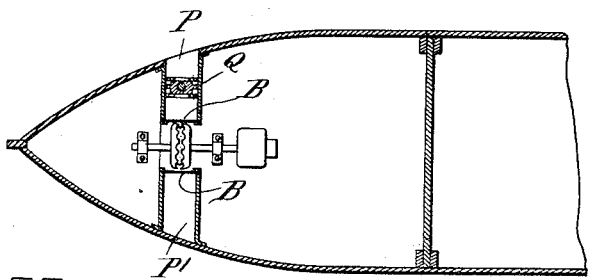

In Figs. 16 and 17 I have shown other forms of utilizing this invention. As will be seen from Fig. 17, the sounder in this case is located in the fore peak, and from Fig. 16 it will be seen that vibrations are delivered into two tubes both together forming a water tank, these tubes being lettered, P, P¹. Both of these tubes may be open like tube P or both may be closed as at P¹ at the outer end. If both are closed means should be provided for keeping them full of water or other liquid so that the vibrations will be received in the liquid as before. In this case but one diaphragm B is used. In Fig. 18 there is a similar arrangement in which, however, the tubes P, P¹ lead to opposite sides of the bow of the ship, the apparatus having two diaphragms in this case, whereas in the former case only one diaphragm was necessary. In this latter case there is shown at Q the diagrammatic representation of an ordinary gate valve adapted to close the tube P to the passage of water so that should repairs be necessary to the apparatus the gate valve can be closed and the diaphragm forming the end of that tube can be repaired as occasion may require without opening a hole in the side of the ship. Such a valve Q should be used in any arrangement in which the outer end of the tube is open; as in Fig. 16 where the tube P is open. Valves of this construction are well known and hence need not be described.

In Fig. 9 I have shown the application of my invention to a bell-shaped vibrator. In this case the vibrator is lettered B³ and is of bell-like character and constructed preferably of bell metal. As shown it carries four armatures B⁴, equidistant from each other and each secured into the inner surface of the bow.

The electro-magnet comprises two pole pieces G¹, H¹, each similar to pole pieces G, H above described and having similar teeth and recesses, those on the pole piece H being shown at $h$ and $h^1$ in Fig. 10. The pole pieces G¹ and H¹ are connected by the core E. The pole piece G¹ however is smaller in diameter than the pole piece H¹ so that the electro-magnet conforms somewhat to the interior shape of the bell.

The electro-magnet is carried by the hollow shaft D¹ to which it is attached between nuts $d$, $d^1$ which clamp its elements together, means of any suitable character being provided so that the electro-magnet and shaft will rotate together.

F is the coil of the electro-magnet, the terminals $f^1$, $f^2$ of which pass up through the hollow shaft D¹ to rings $f^3$, $f^4$ mounted near the upper end of the shaft D¹ but insulated therefrom as before, brushes J, J¹ being provided of the same character as those shown in Fig. 1 connected by wires $j$, $j^1$ to the source of electrical energy to lead the current to the coil F.

The shaft $D^1$ passes up through bearings $D^2$ in the upper part of the bell and into a box $D^3$ in which is a motor comprising a casing M supported on the floor of said box and carrying suitable fields $m$, the armature $m^1$ being located on the shaft $D^1$. This motor may be of any suitable construction and current may be supplied to it in any suitable way, for example, through a cable $m^2$. Its details will be understood by all skilled in the art and hence are not described. Upon the shaft is also located a governor $M^1$ to regulate the speed of rotation of the shaft. The rings $f^3$, $f^4$ above referred to are for convenience located at the upper end of the shaft. A collar $m^3$ held to the shaft by a set screw and resting on the bottom of the box $D^3$ holds the shaft $D^3$ and the parts connected to it in proper relation to their coöperating parts. The operation of this form of my invention is simple. The motor contained in the casing M being supplied with current causes the rotation of the shaft $D^1$ and as the current is supplied to the coil F of the electro-magnet $G^1$, $H^1$, it causes the rapid vibration of the sound bow of the bell, in the manner above described. The bottom of the bell is closed by a rubber or metal cap $d^2$ which may be flat as shown in Fig. 9 or corrugated as shown at $d^3$ in Fig. 12, to prevent the inflow of the water in which the apparatus is suspended.

This apparatus is also valuable for signaling from pier heads for steamships or ferry boats. In this case the apparatus is constructed very much as in Fig. 14, the rotary magnet, etc. being arranged in a closed watertight box having diaphragms B on four sides, the connections resembling those in Fig. 9. The shaft $D^1$ as shown in Fig. 19 is vertical and hollow carrying within it the two wires $f^1$, $f^2$ leading to the core and being connected at their outer ends to the collector rings $f^3$, $f^4$, upon which the brushes J, $J^1$ bear. These brushes are connected with the source of electrical energy through a code signal mechanism represented diagrammatically at $R^2$ operated by a motor $R^3$. M is the casing of the motor by which the shaft $D^1$ is turned. It is connected to the source of electrical energy in any well known way. When the apparatus is very heavy means such as one or more chains should be used to assist in its support below the pier.

From the various forms in which my invention is shown it will be understood that I do not intend to limit it to any one embodiment. On the contrary it is capable of many constructions and many applications.

In its simplest form it comprises an electro-magnet constructed as first above described, that is, having its poles saucer-shaped with projections pointing toward each other, but these poles may be flat with the projections arranged radially. The strength of the electro-magnet can be easily controlled so as to make the code or other signals easily definable.

One especial advantage of the use of a diaphragm vibrator lies in the fact indicated above that it may form one wall of the tank. Thus in the form of vibrator shown in Figs. 1 and 2 the casing A may be bolted to the side of the ship, the inclosure so formed being the tank which may be filled with water or other liquid in which the sound waves begin their passage to the water outside the ship and to the receiving station wherever it may be. So in Figs. 3 to 8, though the casing is of different form and may be the wall of a tank or a part of the side of the ship itself, the diaphragm becomes a portion of the liquid-retaining mechanism or of the side of the ship and its vibrations are directly communicated to the liquid. In all cases where the sound-producing diaphragm is in contact with a body of water held in a tank or similar means, the sound-producing device is for all practical purposes immersed or located in the second body of liquid; and hence I regard my invention as being within the scope of the invention set forth in the patent to Millet and Mundy, No. 773,580, dated November 1, 1904, on which my invention is an improvement which I believe will be found of great advantage in actual practice.

The vibrator also lends itself to the construction of a casing the sides of which each contain a vibrator and which may be made watertight to inclose the rotary magnet or other mechanism for exciting vibrations in the vibrator, such a construction being shown in Figs. 14, 15 and 17, or to such a modification of this construction as is shown in Fig. 18. It is also evident that instead of a special vibrator the vibration-producing mechanism may set up vibrations in a properly bared portion of the skin of a ship.

What I claim as my invention is:—

1. A sounder comprising, in combination, a vibrator and means for vibrating the same, said vibrating means comprising a single electro-magnet and an armature coöperating simultaneously with both poles of said magnet, one of said parts being carried by said vibrator, means for supplying a direct constant current to said electro-magnet during the operation of said sounder, and means independent of the sound producing vibrations of said vibrator for repeatedly varying the relative position of said armature and the magnetic field of said magnet.

2. A sounder comprising, in combination, a vibrator and means for vibrating the same, said vibrating means comprising a single electro-magnet and an armature coöperating simultaneously with both of the poles of said magnet, one of said parts being carried by said vibrator, means for moving the other of said parts with respect to said first-named part, and means for supplying a direct constant current to said electro-magnet during the operation of said sounder.

3. A sounder comprising, in combination, a vibrator capable of magnetic attraction, a single electro-magnet both poles of which are arranged to attract said vibrator simultaneously, means for supplying a direct constant current to said electro-magnet during the operation of said sounder, and means independent of the strength and continuity of said current for repeatedly varying the relative position of said vibrator and the magnetic field of said magnet.

4. A sounder comprising, in combination, a vibrator capable of magnetic attraction, a single electro-magnet both poles of which are arranged to attract said vibrator simultaneously, means for moving said electromagnet with respect to said vibrator to vary its attractive force therefor, and means for supplying a direct constant current to said electro-magnet during the operation of said sounder.

5. A sounder comprising a vibrator and means for vibrating the same, said vibrating means comprising an electro-magnet and an armature, one of said parts being carried by said vibrator, means for supplying a direct constant current to said electro-magnet during the operation of said sounder, and means independent of the strength and continuity of said current for repeatedly varying the relative position of said armature and the magnetic field of said magnet, in combination with means to interrupt said current and thereby to interrupt the operation of said sounder.

6. A sounder comprising a vibrator and means for vibrating the same, said vibrating means comprising an electro-magnet and an armature, one of said parts being carried by said vibrator, means for moving the other of said parts with respect to said first-named part, and means for supplying a direct constant current to said electro-magnet during the operation of said sounder, in combination with means to interrupt said current and thereby to interrupt the operation of said sounder.

7. A sounder comprising a vibrator capable of magnetic attraction, an electromagnet arranged to attract said vibrator, means for supplying a direct constant current to said electro-magnet during the operation of said sounder, and means independent of the strength and continuity of said current for repeatedly varying the relative position of said vibrator and the magnetic field of said magnet, in combination with means to interrupt said current and thereby to interrupt the operation of said sounder.

8. A sounder comprising a vibrator capable of magnetic attraction, an electromagnet arranged to attract said vibrator, means for moving said electro-magnet with respect to said vibrator to vary its attractive force therefor, and means for supplying a direct constant current to said electromagnet during the operation of said sounder, in combination with means to interrupt said current and thereby to interrupt the operation of said sounder.

9. A sounder comprising a vibrator capable of magnetic attraction, an electromagnet having a core provided with a series of projections, said electro-magnet being rotatable on an axis coincident with the axis of said core to bring said projections successively adjacent said vibrator, and means for supplying a direct constant current to said electro-magnet during the operation of said sounder.

10. A sounder comprising a vibrator capable of magnetic attraction, an electromagnet having a core provided with a series of oppositely arranged projections at each pole, said electro-magnet being rotatable on an axis coincident with the axis of said core to bring said projections successively adjacent said vibrator, and means for supplying a direct constant current to said electromagnet during the operation of said sounder.

11. As a means of vibrating a vibrator of the kind described, an electro-magnet comprising a core carrying at each end a disk, the surfaces of said disks being opposed to each other, each disk having a series of projections from its edge, the projections on each disk being opposite the projections on the opposing disk, said core carrying a coil, and means for electrically exciting said coil and means for rotating said disks.

12. As a means of vibrating a vibrator of the kind described, an electro-magnet comprising a core carrying at each end a concave disk, the concave surfaces of said disks being opposed to each other, each disk having a series of projections from its edge, the projections on each disk being opposite the projections on the opposing disk, said core carrying a coil, and means for electrically exciting said coil and means for rotating said disks.

13. As a means for vibrating a vibrator of the kind described, an electro-magnet comprising a core carrying at each end a disk, each disk having a series of projections from its edge, the projections on each disk being opposite the projections on the opposing disk, said core carrying a coil, means for electrically exciting said coil to magnetize said core and disks, and means for periodically interrupting said coil-exciting means as set forth.

14. As a means for vibrating a vibrator of the kind described, an electro-magnet comprising a shaft, a core, two disks located on said shaft one at each side of said core, each disk having a series of projections from its edge, the projections on each disk being opposite the projections on the opposing disk, said core carrying a coil, means for exciting said coil and means for periodically interrupting said coil-exciting means as set forth.

15. A sounder comprising a controllable vibrator and a rotary electro-magnet, said magnet having two poles in parallel planes each pole having a plurality of projections in opposed relation to each other, said vibrator being located adjacent to the path of the magnetic fields of said projections.

16. A sounder comprising a controllable vibrator and a rotary electro-magnet, said magnet having two poles in parallel planes at substantially right angles to the plane of said vibrator, each pole having a plurality of projections in opposed relation to each other, said vibrator being located adjacent to the path of the magnetic fields of said projections.

17. In a submarine signaling device, a plurality of vibrators capable of magnetic attraction and one surface of each of which is in contact with a liquid through which sound waves are to be sent, and means for causing vibrations of said vibrators to originate sound waves comprising a single electro-magnet arranged to attract said vibrators, means for supplying a direct constant current to said electro-magnet, and means independent of the strength and continuity of said current for repeatedly varying the relative position of said vibrators and the magnetic field of said magnet.

18. In a submarine signaling device, a plurality of attractable vibrators one surface of each of which is in contact with a liquid through which sound waves are to be sent, and means for causing vibrations of said vibrators to originate sound waves comprising a single rotary electro-magnet having two poles in parallel planes, each pole having a plurality of projections in opposed relation to each other, said vibrators being located about said rotary magnet and adjacent to the path of the magnetic fields of said projections.

EDWARD C. WOOD.

Witnesses:
H. J. W. FAY,
H. H. STEWART.